July 20, 1937.

E. C. NORTON 2,087,700

PISTON DEFORMER

Filed Sept. 19, 1936

E. C. NORTON INVENTOR.

BY Merrill M. Blackburn
ATTORNEY.

Patented July 20, 1937

2,087,700

UNITED STATES PATENT OFFICE 2,087,700

PISTON DEFORMER

Ernest C. Norton, Moline, Ill.

Application September 19, 1936, Serial No. 101,632

6 Claims. (Cl. 309—12)

The present invention pertains to the power units of self propelled vehicles and more particularly to pistons for use in the motors of motor vehicles. Among the objects of this invention are to provide improved means for deforming the skirts of pistons to cause them to more nearly fit the cylinders in which such pistons have been used; to provide an improved mode of conforming pistons to their cylinders; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Figure 1:
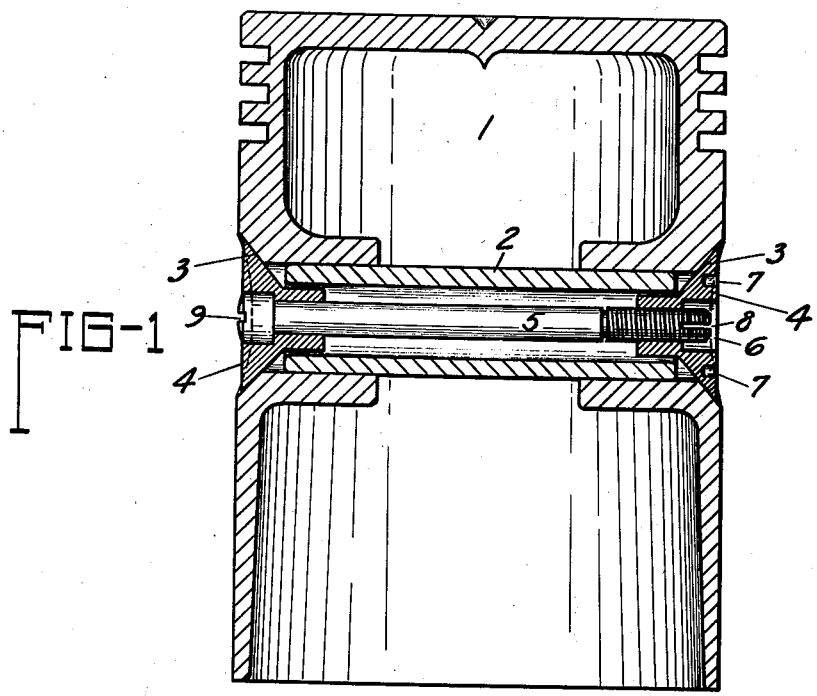
Fig. 1 represents a longitudinal section through a piston embodying my present invention.
Figure 2:
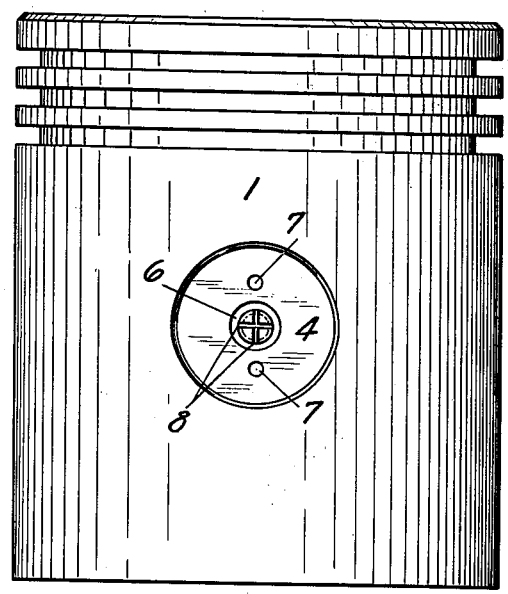
Fig. 2 represents a side elevation of a piston embodying this invention, said elevation being taken from the right side of Fig. 1.

The piston 1 may be provided with any desired number of piston ring grooves, these being old and constituting no part of the present invention. A piston is customarily provided with a hollow wrist pin 2 for attachment of a connecting rod, not shown. The hole in the piston for the reception of the wrist pin 2 extends through the piston from side to side, and I ream out the two ends of this hole, as shown at 3. Plugs 4 are provided with tapered heads to fit the counterbores made in the walls of the pistons. These plugs have holes extending therethrough for the reception of bolts 5, and the holes are counterbored, as indicated at 6. These plugs 4 may or may not be provided with spanner openings 7 but some means of holding a plug 4 against rotation relatively to the piston or causing it to rotate relatively to the bolt 5 is desirable, since it is essential to successful operation of this invention that it be possible to screw the end of bolt 5 into the screw-threaded opening in plug 4.

The screw-threaded end of bolt 5 is cross-slitted, as shown at 8, so that the end may be expanded to prevent the internally screw-threaded plug 4 from backing off from bolt 5 and permitting scoring of the cylinder wall. The head of bolt 5 is provided with a screwdriver slot 9, as shown in Fig. 1, and the bolt can therefore be turned relatively to element 4 to cause tightening up or loosening of the tension on bolt 5. When this tension is increased, the plugs 4 move toward each other and press opposite parts of the piston skirts toward each other to cause deformation of the pistons, making the same somewhat oval in form to more nearly fit the lateral walls of the cylinder, the piston and/or cylinder having become worn. When the parts 4 and 5 have been assembled, as shown in Fig. 1, a prick punch is inserted at the intersection of the cross slots 8 and driven in to expand the end portions of the bolts so as to prevent accidental separation of parts 4 and 5.

It will be obvious that when lateral pressure is placed upon the skirt of a piston by screwing the bolt 5 into the nut or plug 4, these opposite sides will be drawn toward each other, resulting in the expansion of the sides at a right angle thereto. This will cause the piston to more nearly fit the cylinder. Such wear often makes necessary a re-grinding job for the cylinders and the substitution of over-sized pistons, at a greatly increased cost to the customer. By making use of this construction, the pistons are caused to assume a form more nearly like that of the cylinders in which the pistons have been working and the result is that the repair job costs much less than if the cylinders had to be re-ground and new pistons of over-size fitted thereto in the customary manner.

At the present time it is the custom of some manufacturers to grind pistons in an oval shape, in cross-section, these pistons being the so-called cam-ground pistons. The present invention permits the deformation of cylindrical pistons into the oval form and the restoration of cam-ground pistons to their oval form when they have become approximately cylindrical due to wear.

It will of course be understood that the specific description of structure and method set forth above may be departed from without departing from the spirit of this invention as disclosed herein and as covered by the appended claims.

Having now described my invention, I claim:

1. In a piston having an opening extending transversely therethrough and a pin in said opening, a pair of plugs in opposite ends of said opening and a bolt having a head at one end and screw-threads at the opposite end extending through said plugs and said pin, one of the plugs having screw-threaded connection with the screw-threaded end of the bolt to draw the opposite sides of the piston toward each other.

2. A piston having a wrist pin opening extending therethrough and a wrist pin in said opening, the ends of the opening being shaped to receive plugs therein and permit the plugs to enter so that they will not project beyond the surface of the piston, said plugs being counterbored and provided with longitudinal openings for the reception of a bolt, one of the plugs being internally screw-threaded to cooperate with a bolt, and a bolt having a head seated in the counterbore of one of the plugs and its opposite end in screw-threaded engagement with the other plug.

3. A transversely perforated piston having a wrist pin in the transverse perforation, in combination with skirt deforming means, comprising a bolt and a pair of plugs, one of said plugs being counterbored to receive the head of the bolt and the other one internally screw-threaded to receive the screw-threaded end of the bolt.

4. Means for transversely compressing the skirt of a piston, comprising a pair of plugs and a bolt, the plugs being longitudinally apertured for the reception of the bolt and having heads for engagement of depressed faces at opposite sides of a piston, the longitudinal opening through one of the plugs being screw-threaded to cooperate with the screw-threaded end of the bolt.

5. A structure as defined by claim 4 in which the screw-threaded end of the bolt is longitudinally slitted to make possible the expansion of the end of the bolt.

6. A structure as defined by claim 4 in which the screw-threaded end of the bolt is longitudinally slitted and the plugs are counterbored, one for the reception of the head of the bolt and the other to permit expansion of the slitted end of the bolt.

ERNEST C. NORTON.